July 8, 1958
J. K. MOSHER
2,842,157
QUICK THROW PILOT VALVE
Filed March 19, 1956
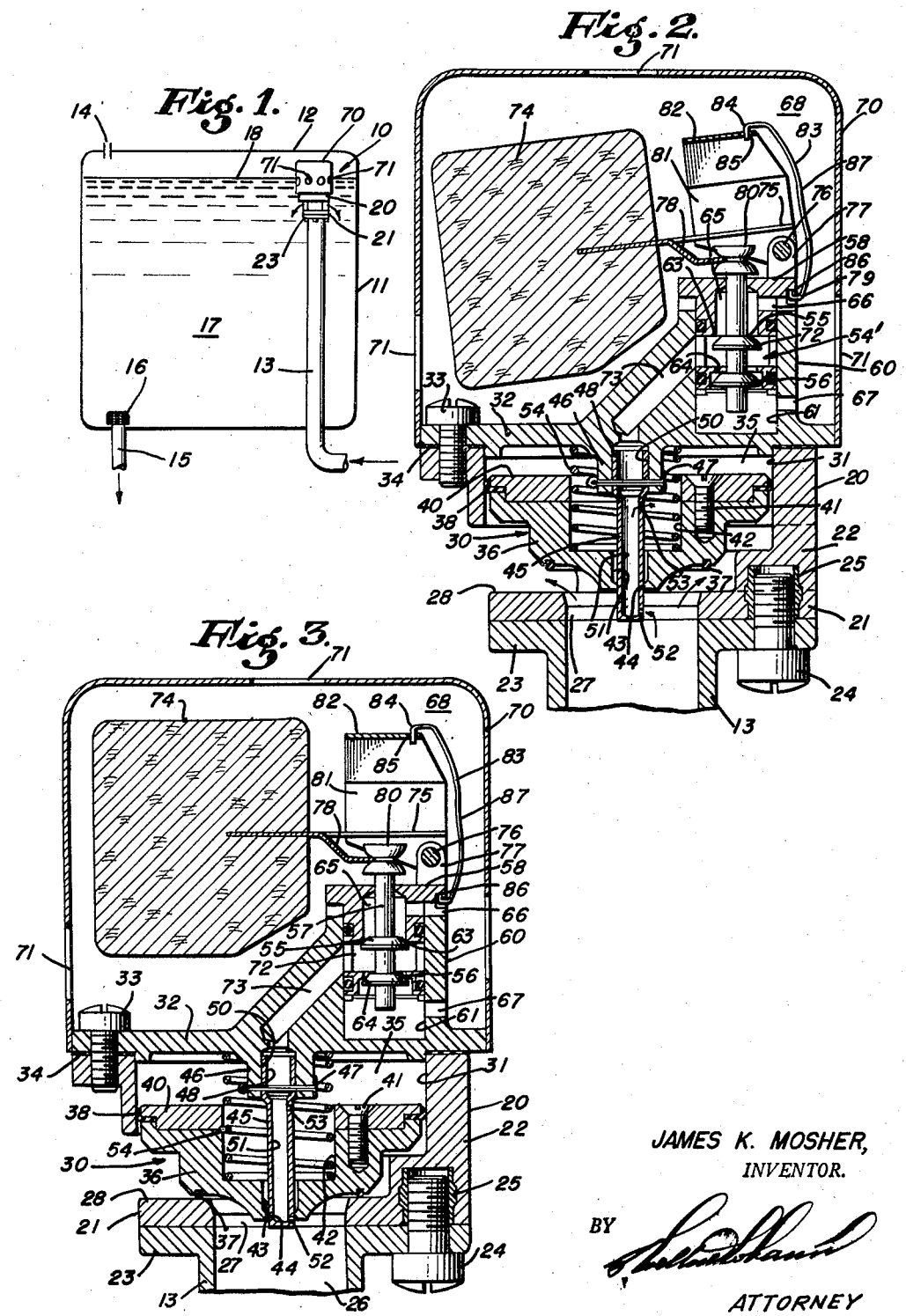
JAMES K. MOSHER,
INVENTOR.
BY
ATTORNEY United States Patent Office 2,842,157
Patented July 8, 1958

2,842,157

QUICK THROW PILOT VALVE

James K. Mosher, Pasadena, Calif., assignor to Schulz Tool and Manufacturing Co., San Gabriel, Calif., a corporation of California Application March 19, 1956, Serial No. 572,256

3 Claims. (Cl. 137—418)

The present invention relates generally to a liquid level control valve arrangement and relates more specifically to a liquid level control valve adapted for use in a compartment.

In various types of compartments, such as, for example, in aircraft fuel tanks, it is a necessity that adequate level control be maintained in such tanks. It is a further necessity that flow control valve arrangements operable in response to a level responsive element be constructed in such a manner as to enable a termination of liquid flow into such tanks or compartments when a predetermined level is reached. Prior like devices have had an inherent disadvantage in connection with the operating characteristics of the liquid elevel responsive device or apparatus utilized therewith in that such devices as, for example, floats or the like must usually be pivotally arranged with action thereof being relatively slow as a liquid level increases in the compartment, thereby creating a slow acting situation in connection with shut-off valve members. In these prior devices, it was not always possible to predetermine the level at which the level in the compartment would be maintained due to the relatively slow acting characteristics of the float member thereof and associated delay in operating characteristics of the balance of mechanism utilized therewith.

In addition to the above, like prior devices have often been extremely heavy and inefficient as to prohibit use in aircraft situations where reliability, lightness in weight and effective flow characteristics are necessities rather than mere desirabilities.

Accordingly, it is a main object of the present invention to provide a novel liquid level control valve.

It is another object of the present invention to provide a liquid level control valve for use in a liquid retaining compartment and wherein improved means are provided for operating a liquid level responsive device as by a snap action to effect opening or closing of a valve member.

It is a further object of the invention to provide a liquid level control valve, having liquid flow control and liquid delivery characteristics to enable delivery of a liquid to a compartment with a minimum of pressure drop across a main valve member.

Other and further important objects of the present invention will become apparent from the disclosures in the following detailed specification, appended claims and accompanying drawing, wherein:

Fig. 1 is a diagrammatic view, showing the liquid level control valve arrangement of the present invention incorporated in the liquid compartment;

Fig. 2 is an enlarged sectional view of the liquid level control valve with the valve member being shown in an open position; and Fig. 3 is a sectional view similar to Fig. 2, showing the valve member in a closed position.

Referring to the drawing, and referring primarily to Fig. 1 thereof, the liquid level control valve of the present invention is shown as indicated generally at 10 and adapted for use in connection with a compartment or tank 11. As shown, the valve arrangement 10 is adapted for disposition adjacent an upper wall 12 of the compartment 11, with a liquid filler pipe 13 being provided for delivery of a liquid to the valve 10. The upper portion of the compartment 11 is vented as at 14 and is further provided with an exit or withdrawal conduit 15, which may be provided with a strainer or the like 16. Liquid in the compartment 11 is indicated at 17 and is adapted to flow into the tank to an upper level, indicated generally at 18.

With reference primarily to Figs. 2 and 3, the valve arrangement of the present invention includes a body 20, having a base flanged portion 21, supported with respect to the body as by webs 22. The flanged portion 21 is adapted for attachment to a fitting 23, formed on the upper end of the delivery pipe or conduit 13, as by suitable screws 24 adapted for threadable connection with an insert arrangement 25. Liquid is adapted for delivery to the interior of the compartment 11 by way of an interior passageway 26 formed in the conduit 13 and through an inlet port 27 formed in the flanged portion 21. The upwardly directed surface 28 of the flanged portion 21 is disposed substantially normal to the port 27 and provides a valve seat for a valve member, indicated generally at 30.

As shown in the drawings, a bore 31 is provided in the body 20, the upper end of which is closed as by a cover plate 32 that is secured to the body 20 as by suitable screws 33, there being a gasket or the like 34 disposed between the cover 32 and the body 20. The valve member 30 is adapted for reciprocal movement within the bore 31 and provides a movable wall for a chamber 35, formed between the valve member 30 and the cover 32 and defined by the walls of the bore 31. The valve member 30 includes a substantially conical lower member 36 which supports an annular sealing member 37, which is adapted for cooperation with the surface 28 of the flanged portion 21. A sealing member 38 is disposed about the upper periphery of the lower portion 36, this sealing being adapted for cooperation with the wall of the bore 31. The sealing member 38 is retained in position as by a retainer 40 that is secured to the lower portion 36 as by suitable screws 41. A recess 42 is formed in the upper surface of the lower member 36 and through the central area of the retainer 40 with a generally small recess 43 being formed in the base of the recess 42. A still smaller bore 44 is formed between the recess 43 and the lower surface of the lower member 36. The valve member 30 is adapted to be guided in its movement in the bore 31, as by a centrally disposed guide member 45 that extends through the bore 44 and has its upper end secured in a boss 46, formed inwardly from the cover member 32. A cotter pin 47 extends laterally through the boss 46 and the upper end 48 of the guide 45 in order to secure the guide in position within the bore 50 formed in the boss 46. It may be seen that the guide 45 is formed from substantially tubular material with the portion 48 being slightly larger than the lower portion thereof, thereby providing a passageway 51 therein. The lower end of the guide 45 is provided with an orifice 52 that communicates between the passageway 26 and the conduit 13 and the interior passageway 51 in the guide member 45. Additionally, a second orifice 53 through the wall of the guide member 45 communicates between the interior of the guide member 45 and the chamber 35.

In order that the valve member 30 may be biased for the closed position, a compression spring 54 is disposed in the chamber 35 and reacts between the interior surface of the cover 32 and the base of the recess 42.

The pressure differential operable valve member 30 is adapted for operation through action of a pilot valve, indicated generally at 54'. The pilot valve 54' includes a pair of valve members 55 and 56 that are formed on a common stem 57 which is slidably positioned in a fitting 58. The fitting 58 is disposed in an upwardly directed portion 60 at a bore 61 formed therein from the cover member 32. The fitting 58 is provided with valve seats 63 and 64 that are adapted for cooperation with the valve members 55 and 56 with the valve member 55 communicating through a recess 65 with a vent passage 66 and the valve member 56 communicating with the lower end of the bore 61 and through a second vent passage 67. The vent passages 66 and 67 communicate with an interior space 68 of a dampening members 70 that is attached to the cover portion 32 about the periphery thereof. The dampening member 70 is provided with openings 71 which communicate with the interior of the compartment 11. The fitting 58 is provided with an open area 72 intermediate the valve seats 63 and 64 which communicates by way of a passage 73 with the central bore 51 of the guide member 45.

In order to provide an actuating means for the pilot valve 54', a level responsive element in the form of a float 74 is disposed within the dampening member 70. The float 74 is connected to a bell crank lever 75 that is pivoted as at 76 on tabs 77 that are in turn attached to the fitting 58. A depended portion 78 from the lever 75 is bifurcated and operatively connected to an upper end portion 80 of the pilot valve stem 57. It may thus be seen that upon movement of the float member 74 about the pivot 76, the pilot valve stem 57 will be moved upwardly or downwardly to move the valve members 55 and 56 into or out of engagement with the valve seats 63 and 64.

The lever 75 is provided with upwardly directed side plates or arms 81, which are connected together at their upper end as by a transverse plate 82. A snap action type leaf spring 83 is disposed between the transverse plate 82 and the fitting 58 with an upper hooked end portion 84 being disposed in an opening 85 in the transverse plate and a lower hooked end portion 79 being disposed in an upwardly directed notch 86 in the fitting 58. The leaf spring 83 is of the type having a generally centrally disposed depression 87 which functions to permit the spring to flex in a snap action manner.

In operation of the present liquid level control valve, with the float 74 in its downward position as shown in Fig. 2, the pilot valve member 54' will be opened, thus connecting the chamber 35 to a region of low pressure, namely, the upper portion of the compartment 11 by way of the passages 66 and 67 past the valve members 55 and 56 and through the passage 73 and bore 51 in the guide 45 through the orifice 53. The chamber 35 will also be vented to the interior 26 of the conduit 13 by way of the orifice 52, bore 51 and orifice 53. Due to the action of the compression spring 54, the valve member 30 will be in a closed position with the sealing ring 37 against the surface 28 of the flanged body portion 21. As liquid is delivered under pressure to the face of the valve member 30, the pressure of this liquid will act against such face to tend to open the valve member. Inasmuch as the pressure in the chamber 35 as bled therein by way of the orifice 52, bore 51 and orifice 53 is reduced by bleed to a region of lower pressure as hereinbefore described, the differential in pressure thus created across the valve member 30 will cause the valve member to move against the compression of the spring 54 and inwardly toward the chamber 35, thus to open the valve member and permit liquid flow from the interior 26 of the conduit 13 through the port 27 and outwardly past the webs 22 into the interior of the compartment 11.

As the liquid level 18 reaches the level of the float 74, the float will tend to rise against the compression of the leaf spring 83 i. e., as can be seen on the drawing, the rising movement of the float will tend to straighten the bow in the leaf spring 83, thereby increasing the stress therein. As the force exerted by the tendency of the float to rise is increased, the leaf spring will permit a snap action of the float 74, thus moving the pilot valve 54 to a closed position and terminating bleed from the bore 51 in the guide member 45 i. e., the movement of the float against the upper end of the leaf spring will cause snap flexing of the spring by reason of its central depression, or deformation. At this time, the pressure of the liquid being bled into the chamber 35 will be increased in this chamber until the pressure on each side of the valve member 30 is equalized, whereupon the compression spring 54 will act to move the valve member 30 toward a closed position, thus terminating flow from the conduit 13 as shown in Fig. 3.

It is to be noted that even though the float 74 and pilot valve 54 are moved in a snap action manner, the valve member 30 will be relatively slow to act and will move steadily from one position to another due to the restricted bleeds into and from the chamber 35 by way of the orifices 52 and 53. This action is desirable in order to permit smooth opening and closing of the valve member 30 and prevent undesirable surges in the filler conduit 13. It may also be seen that the construction of the valve arrangement of the present invention is such as to permit manufacture therefrom with a minimum of components and lightweight materials.

Having thus described the invention and the present embodiment thereof, it is desired to emphasize the fact that many modifications may be resorted to in a manner limited only by a just interpretation of the following claims.

I claim:

1. In a valve mechanism in combination: means comprising a valve having a reciprocable stem; actuating means comprising a bell crank lever having a pivot; a float carried at the end of one arm of the bell crank lever, the other arm of the said lever being substantially upright, said one arm having an offset portion having a bifurcated end engaging said valve stem at a position intermediate said float and pivot, said upright arm having spaced side walls and a transverse portion spaced from said pivot; means comprising a bowed leaf spring having an intermediate deformation therein whereby the spring may flex with a snap action movement, said leaf spring having an upper hooked end portion and a lower hooked end portion, said upper hooked end portion being engaged in an opening in said transverse portion of said upright arm; fixed means carrying said pivot having a notch therein, the lower hooked end portion of said leaf spring being hooked into said notch, said opening and notch being spaced so that lifting of said float tends to straighten said bowed leaf spring such that stress in the spring resists lifting of the float and the spring flexes at said deformation with a snap action.

2. In an actuating mechanism for valves or the like, in combination: means comprising a bell crank lever having a pivot; actuating means connected to the end of one arm of said bell crank lever; means comprising a bowed leaf spring having an intermediate deformation therein whereby the spring may flex with a snap action movement, said leaf spring being connected at its lower end to a fixed point adjacent the pivot of the bell crank lever and being connected at its opposite end to a point on the other arm of said bell crank lever, said leaf spring normally having such position that rotation of said bell crank lever, by said actuating means, tends to straighten said bowed leaf spring such that stress in the spring resists said rotation and the spring flexes at said deformation with a snap action.

3. In a valve mechanism in combination: means comprising a valve having a stem; actuating means comprising a bell crank lever having a pivot; a float carried at the end of one arm of the bell crank lever, the other arm of said lever being substantially upright; means comprising a bowed leaf spring having an intermediate deformation therein whereby the spring may flex with a snap action movement, said leaf spring having its upper end attached to the other arm of said bell crank lever; fixed means carrying said pivot and said leaf spring having its lower end engaging said fixed means at a point spaced from the pivot, the relative positions of the ends of the leaf spring being normally such that lifting of the said float tends to straighten said bowed leaf spring so that stress in the spring resists lifting of the float and the spring flexes at said deformation with a snap action.

References Cited in the file of this patent

UNITED STATES PATENTS

| | | |
|---|---|---|
| 1,983,061 | Ambroz et al. | Dec. 4, 1934 |
| 2,075,548 | Schaser | Mar. 30, 1937 |
| 2,313,341 | Holmes | Mar. 9, 1943 |
| 2,493,474 | Breese | Jan. 3, 1950 |
| 2,525,014 | Berge | Oct. 10, 1950 |
| 2,749,936 | Mosher | June 12, 1956 |